(12) United States Patent
Sawaf et al.

(10) Patent No.: US 10,291,288 B2
(45) Date of Patent: May 14, 2019

(54) AC/DC DOWNHOLE POWER SWITCH USING SWITCHING COMMUNICATION SYSTEM

(71) Applicant: Schlumberger Technology Corporation, Sugar Land, TX (US)

(72) Inventors: Tamim Sawaf, Houston, TX (US); Koichi Naito, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/199,277

(22) Filed: Jun. 30, 2016

(65) Prior Publication Data

US 2018/0006684 A1    Jan. 4, 2018

(51) Int. Cl.
*G01V 11/00* (2006.01)
*H04B 3/54* (2006.01)
*E21B 47/12* (2012.01)
*H04B 3/58* (2006.01)
*H02J 4/00* (2006.01)
*E21B 49/10* (2006.01)

(52) U.S. Cl.
CPC .......... *H04B 3/548* (2013.01); *E21B 47/12* (2013.01); *E21B 49/10* (2013.01); *H02J 4/00* (2013.01); *H04B 3/58* (2013.01); *H04B 2203/5475* (2013.01)

(58) Field of Classification Search
CPC ....... H04B 3/548; E21B 47/12; G01V 11/002; G01V 11/005
See application file for complete search history.

(56) References Cited

U.S. PATENT DOCUMENTS

| 4,720,996 | A   |   | 1/1988  | Marsden et al. |
|-----------|-----|---|---------|----------------|
| 7,154,412 | B2  |   | 12/2006 | Dodge et al.   |
| 7,525,264 | B2  |   | 4/2009  | Dodge          |
| 9,063,241 | B2  | * | 6/2015  | Hernandez-Marti .... G01V 1/22 |
| 2011/0090091 | A1 | * | 4/2011 | Lerche ................ E21B 41/0021 340/853.2 |
| 2011/0248566 | A1 | * | 10/2011 | Purkis ................. E21B 33/0355 307/40 |
| 2016/0003035 | A1 | * | 1/2016 | Logan ..................... E21B 47/12 340/854.6 |
| 2016/0032714 | A1 |   | 2/2016 | Rao et al. |

* cited by examiner

*Primary Examiner* — Muhammad N Edun
*Assistant Examiner* — Jerold B Murphy
(74) *Attorney, Agent, or Firm* — Michael Dae

(57) ABSTRACT

A method includes receiving a request to supply power of a first type to a toolstring. The toolstring includes a first tool that operates using the power of the first type and a second tool that operates using power of a second type. The method also includes receiving an indication of a relay configuration relating to relay positions of relays of a switching circuit in the toolstring. The relay configuration enables the switching circuit to selectively supply the power of the first type or the power of the second type to the toolstring via a switching communication system. The method further includes, when the relay configuration does not enable the switching circuit to supply the power of the first type, sending a first command to the switching communication system to change the relay configuration to enable the switching circuit to supply the power of the first type.

20 Claims, 3 Drawing Sheets

AC/DC DOWNHOLE POWER SWITCH USING SWITCHING COMMUNICATION SYSTEM

BACKGROUND

The present disclosure relates to controlling power for downhole tools. In particular, the present disclosure relates to using a downhole power switch and a switching communication system to supply power of multiple power types.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

To locate and extract oil, water, natural gas, or other materials, a wellbore may be drilled into a geological formation. Downhole tools may be placed into the wellbore to measure properties of the materials in the wellbore. Some downhole tools may be powered by alternating current (AC) power. As such, a multiconductor cable from the surface may both enable communication with the downhole tool and provide AC power. Yet some downhole tools may be powered by direct current (DC) power. The downhole tools that use DC power thus do not accept AC power provided over a multiconductor cable.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

In one example, a method includes receiving, via a processor at a surface location, a request to supply power of a first type to a toolstring disposed in a wellbore in a geological formation, wherein the toolstring includes a first tool that operates using the power of the first type and a second tool that operates using power of a second type different from the first type. The method also includes receiving, via the processor, an indication of a relay configuration relating to one or more relay positions of one or more relays of a switching circuit in the toolstring, wherein the relay configuration is that enables the switching circuit to selectively supply the power of the first type or the power of the second type to the toolstring via a switching communication system. The method further includes, when the relay configuration does not enable the switching circuit to supply the power of the first type, sending, via the processor, a first command to the switching communication system to change the relay configuration to enable the switching circuit to supply the power of the first type.

In another example, one or more tangible, non-transitory, machine-readable media include instructions to cause a processor to receive a power type of a tool of a toolstring. The instructions also cause the processor to receive one or more relay positions of one or more relays of a switching circuit in the toolstring that supplies power of multiple power types via a switching communication system. The instructions further cause the processor to send a first command to the switching communication system to change the one or more relay positions if the switching circuit is not positioned to supply power of the power type of the tool. The instructions also cause the processor to send a second command to a power circuit to supply power of the power type of the tool to the tool via the switching circuit.

In another example a system includes a power supply that supplies power of multiple power types. The system also includes a cable that includes multiple conductors, wherein the power supply couples to the cable. The system further includes a toolstring that couples to the cable. The toolstring includes a switching circuit that couples to the power supply via the cable, wherein the switching circuit comprises one or more relays. The toolstring also includes a switching communication system that couples to the switching circuit. The toolstring further includes a first tool that operates using a first power type of the multiple power types. The toolstring also includes a second tool that operates using a second power type of the multiple power types. The toolstring also includes a tool communication system that couples to the first tool and the second tool. The system also includes a computing device that couples to the cable. The computing device includes a processor that sends a first command to the switching communication system to engage the switching communication system. The processor is also that receives one or more relay positions of the switching circuit using the switching communication system. The processor is further that sends a second command to the switching communication system to change the one or more relay positions. The processor is also that sends a third command to the power supply to supply power of the first power type or the second power type based on the one or more relay positions.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to controlling power for downhole tools of a toolstring. The downhole tools of the toolstring may be powered by multiple power types. For example, the tools may be powered by alternating current (AC) power or by direct current (DC) power. It may be advantageous to use the same components of the toolstring, such as a multiconductor cable and/or a switching communication system of the toolstring, to power the DC-powered downhole tools, rather than retrofitting the AC-powered toolstring to add new hardware and electrical components. In particular, the present disclosure relates to using a downhole power switch and the switching communication system to supply AC and DC power to a variety of tools in a toolstring.

Figure 1:
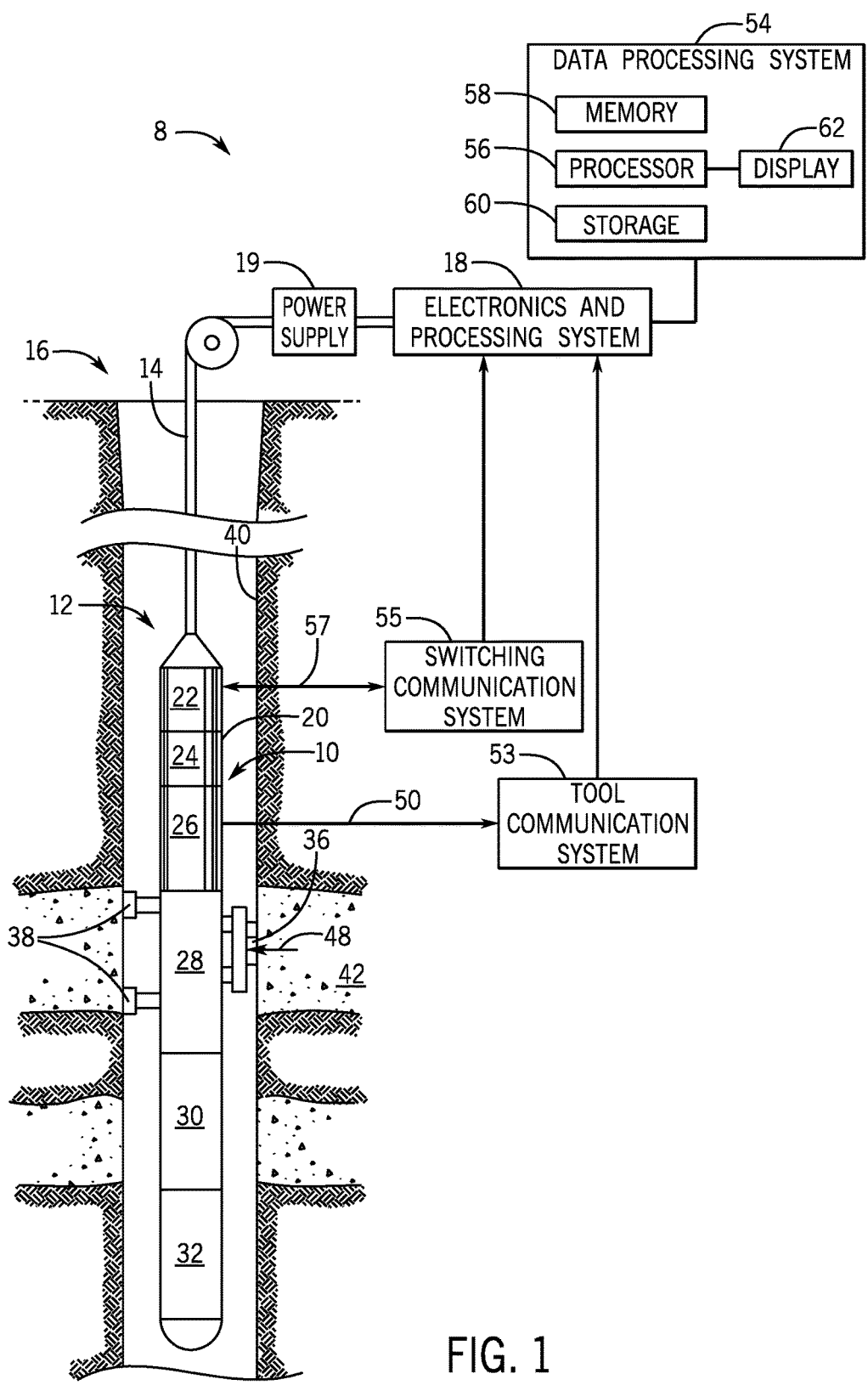
FIG. 1 is a schematic diagram of a hydrocarbon reservoir that may use a wireline downhole toolstring, in accordance with an embodiment of the present disclosure.

By way of introduction, FIG. 1 is a schematic diagram of a hydrocarbon reservoir 8 that may use a wireline downhole toolstring 10 in accordance with an embodiment of the present disclosure. The toolstring 10 is inserted into a wellbore 12 located within the hydrocarbon reservoir 8. For example, in the illustrated embodiment, the toolstring 10 is suspended in the wellbore 12 from the lower end of a multi-conductor cable 14 that is spooled on a winch at surface 16. The cable 14 is communicatively coupled to an electronics and processing system 18. The cable 14 is also communicatively coupled to one or more power supplies 19 that may supply power to the toolstring 10.

The toolstring 10 includes an elongated body 20 that houses a power switch 22 that may switch between providing AC power and DC power to one or more tools (e.g., 28, 30, 32) of the toolstring 10. The toolstring 10 also houses a power cartridge 24 that may include electronics, power supplies, a power converter, or the like, for measurement. The power switch 22 may be coupled to a power supply 19 located at the surface 16 via the cable 14. The toolstring 10 houses a tool communication system cartridge 26 that may collect data from other downhole tools (e.g., 28, 30, 32) and package and send the data via a tool communication system 53 to the electronics and processing system 18 at the surface 16. In some embodiments, the telemetry cartridge may provide measurements. The toolstring 10 houses downhole tools 28, 30, 32 that may provide various functionalities, such as fluid sampling, fluid testing, operational control, communication, among others. For example, the tools (e.g., 28, 30, 32) may provide additional functionality such as fluid analysis, resistivity measurements, operational control, communications, coring, and/or imaging, among others. As should be noted, other data acquisition tools may be used to employ the systems and techniques described herein. For example, in certain embodiments, the data acquisition tool may be a logging while drilling tool, seismic acquisition tool, or the like.

In the example shown in FIG. 1, the tool 28 is a fluid communication tool 28 that has a selectively extendable probe 36 and backup pistons 38 that are arranged on opposite sides of the elongated body 20. The extendable probe 36 selectively seals off or isolates selected portions of a wellbore wall 40 of the wellbore 12 to fluidly couple to the adjacent formation 42 and/or to draw fluid samples (e.g., reservoir fluid 48) from the formation 42. The probe 36 may include a single inlet or multiple inlets designed for guarded or focused sampling. The reservoir fluid 48 may be expelled to the wellbore 12 through a port in the body 20 or the reservoir fluid 48 may be sent to one or more fluid sampling modules 30, 32. The fluid sampling modules 30, 32 may include sample chambers that store the formation fluid. In the illustrated example, the electronics and processing system 18 and/or a downhole control system control the extendable probe assembly 36 and/or the drawing of a fluid sample from the formation 42.

The tools 28, 30, 32 may include tools that are powered by alternating current (AC) power (e.g., supplied by the power supply 19) and tools that are powered by direct current (DC) power (e.g., supplied by the power supply 19). For example, tool 28 may be a sampling tool powered by AC power. As another example, tool 30 may be a scanner tool powered by DC power. In some embodiments, both the AC-powered tool 28 and the DC-powered tool 30 may be powered via the cable 14. As such, the AC-powered tool 28 may not be powered while the DC-powered tool 30 is powered, and vice versa. While the preceding example identifies an AC-powered tool 28 located above a DC-powered tool 30 on the toolstring 10, it should be understood that DC-powered tools may be located above AC-powered tools as well.

The tool communication system cartridge 26 and tools 28, 30, 32 may include sensors that may collect and transmit data 50 associated with the fluid properties and the composition of the reservoir fluid 48 to the electronics and processing system 18 at the surface 16 via the tool communication system 53 of the tool communication system cartridge 26, where the data 50 may be stored and processed in a data processing system 54 of the electronics and processing system 18. The data 50 may include a plurality of measurements representative of information associated with, for example, reservoir temperature, pressure, compositions, the gas-to-oil ratio (GOR), asphaltene content, density, viscosity, or a combination thereof related to the reservoir fluid 48. The tool communication system 53 may be any suitable telemetry system that collects and/or monitors measurement and/or other data gathered by the tools 28, 30, 32. In some embodiments, the tool communication system 53 may be a telemetry system, such as the Schlumberger Enhanced Digital Telemetry System (EDTS), which is provided at least in part by the Schlumberger Enhanced Digital Telemetry Cartridge (e.g., the tool communication system cartridge 26) and housed in the toolstring 10. The tool communication system 53 may be used to communicate with AC-powered and DC-powered tools.

The electronics and processing system 18 may also be used to control power and telemetry functions of the toolstring 10. For example, the electronics and processing system 18 may include the Schlumberger wireline acquisition front end (WAFE) system, or the enhanced version (eWAFE) of the WAFE system, which may couple to the toolstring 10 and be used to provide power and telemetry interface via the cable 14 to the toolstring 10. In some embodiments, the electronics and processing system 18 may instruct the power supply 19 and/or the power switch 22 to provide telemetry, electronics, and/or power supply functions to the one or more tools 28, 30, 32. As illustrated, the electronics and processing system 18 may send instructions 57 to control the power switch 22 via a switching communication system 55. The electronics and processing system 18 may also receive information 57, such as position of relays of the power switch 22, from the power switch 22 via the switching communication system 55. The switching communication system 55 may be any suitable communication system that is not the tool communication system 53 and may control the power switch 22 and receive information from the power switch 22. In some embodiments, the switching communication system 55 may be a telemetry system, such as the Schlumberger Lite Telemetry System (LTS). In some embodiments, the switching communication system 55 may be a dedicated communication system for monitoring and controlling the power switch 22. Like the tool communication system 53, the switching communication system 55 may be part of the toolstring 10.

The data processing system 54 may include one or more processors 56, memory 58, storage 60, and/or display 62. The memory 58 may include one or more tangible, non-transitory, machine readable media collectively storing one or more sets of instructions for operating the toolstring 10, controlling power to the toolstring 10, collecting and analyzing telemetry data, calculating and estimating fluid properties of the reservoir fluid 48, modeling the fluid behaviors using, for example, the equation of state models, and/or identifying certain reservoir realization scenarios associated with observed fluid behaviors. In certain embodiments, the data processing system 54 may apply filters to remove noise from the data 50.

The processor 56 may execute instructions stored in the memory 58 and/or storage 60 to perform these functions. For example, the instructions may cause the processor 56 to provide instructions to the electronics and processing system 18 to control power to the one or more tools 28, 30, 32 via the power supply 19 and/or the power switch 22. The instructions may be in the form of a software application, such as the Schlumberger Maxwell acquisition system software. As such, the memory 58 and/or storage 60 of the data processing system 54 may be any suitable article of manufacture that can store the instructions. By way of example, the memory 58 and/or the storage 60 may be read-only memory (ROM), random-access memory (RAM), flash memory, an optical storage medium, or a hard disk drive. The display 62 may be any suitable electronic display that can display information (e.g., diagrams, logs, tables, cross-plots, reservoir maps, etc.) relating to telemetry, electronics, and/or power in the toolstring 10, properties of the well as measured by the toolstring 10. It should be appreciated that, although the data processing system 54 is shown by way of example as being located at the surface 16, the data processing system 54 may be located in the toolstring 10. In such embodiments, some of the data 50 may be processed and stored in the toolstring 10 (e.g., within the wellbore 12), while some of the data 50 may be sent to and processed at the surface 16 (e.g., in real time).

Figure 2:
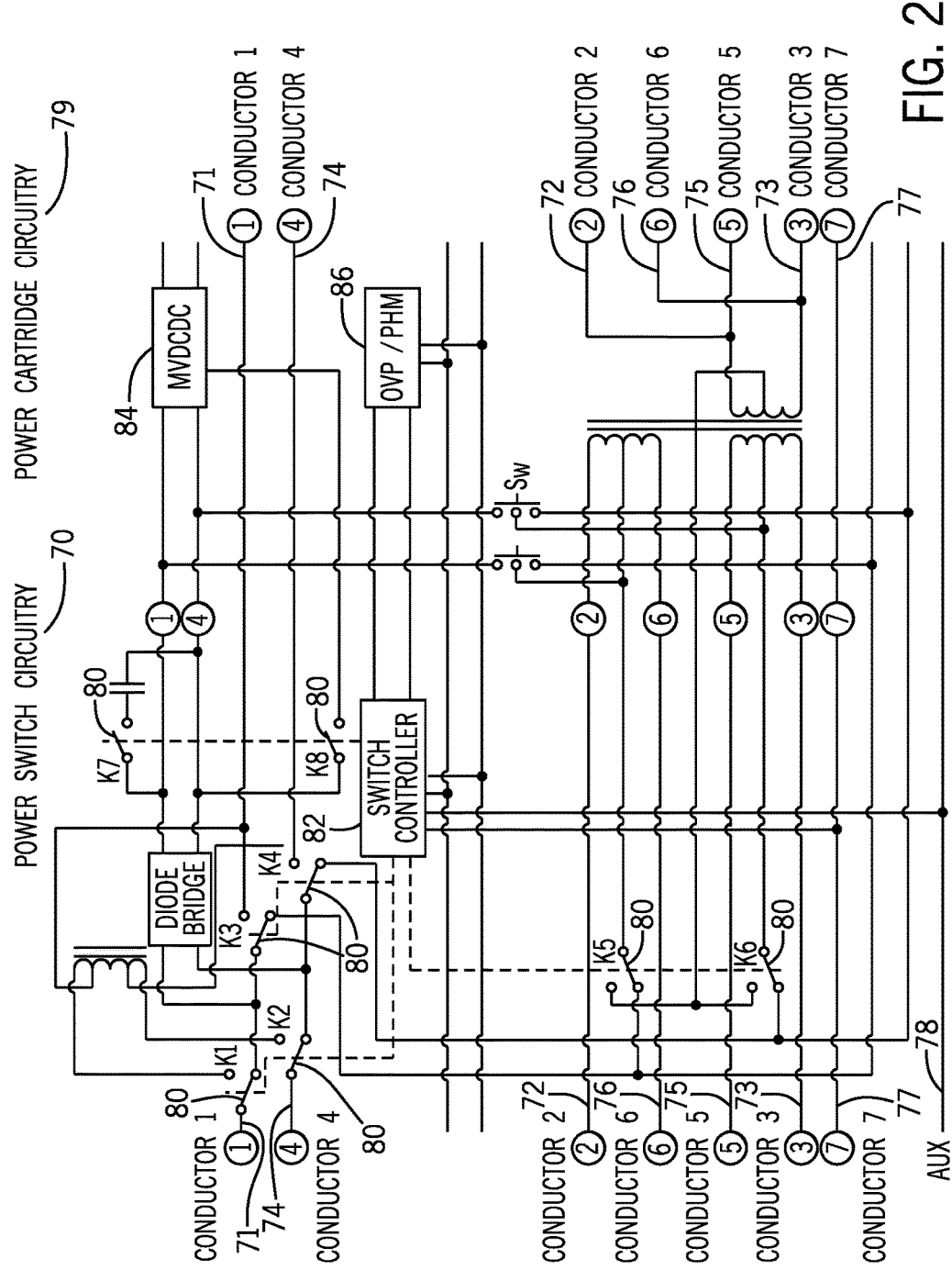
FIG. 2 is a circuit diagram of example circuitry of a power switch and a power cartridge of FIG. 1, in accordance with an embodiment of the present disclosure.

FIG. 2 is a circuit diagram of example circuitry of the power switch 22 (e.g., power switching circuitry 70) and the power cartridge 24 (e.g., power cartridge circuitry 79) of FIG. 1, in accordance with an embodiment of the present disclosure. The power switching circuitry 70 includes relays 80, which are coupled to certain conductors (71, 74) (e.g., wires) of the cable 14 and to various interconnecting nodes of power switching circuitry 70. In operation, AC power (e.g., supplied by a power supply 19 located at the surface 16 via the cable 14) may be delivered to the AC-powered tools (e.g., 28) on a first set of conductors of the cable 14. In some embodiments, AC power may be delivered to the AC-powered tools using two or more of conductors 71-77. DC power (e.g., supplied by the power supply 19 located at the surface 16 via the cable 14) may also be delivered to DC-powered tools (e.g., 30) on a second set of conductors of the cable 14. For example, DC power may be delivered to the DC-powered tools using one of the two or more conductors 71-77 that deliver AC power to the AC-powered tools. As such, the first and second set of conductors may overlap or be the same. A position (e.g. open or closed) of at least one relay 80 corresponding to the overlapping conductor(s) may then be changed when switching from providing AC power to DC power, or vice versa. That is, a set (e.g., a relay configuration) of relay positions may correspond to providing AC power, while another set (e.g., another relay configuration) of relay positions may correspond to providing DC power. As illustrated, the relays 80 of the power switching circuitry 70 are set in a configuration to provide DC power.

As illustrated, in one embodiment, the cable 14 may include seven conductors 71-77. Some downhole tools may be powered by AC power and use two conductors (e.g., 71, 74) to provide AC power, as well as four additional conductors (e.g., 72, 73, 75, 76) for AC power and/or communication. For example, the four additional conductors may be used to provide AC power and/or communication in sonde (e.g., probe, caliper, mechanized arms, and the like) operation. Other downhole tools may be powered by DC power and may use six conductors (e.g., 71-76) to provide DC power and to communicate. As such, positions of relays 80 corresponding to the six conductors (e.g., 71-76) that are used to provide AC and DC power may change when switching from providing AC power to providing DC power, and vice versa. The example circuitry 70 also includes other conductors, such as an auxiliary conductor 78. As illustrated, the auxiliary conductor 78 may be used as a return path. In some embodiments, the auxiliary conductor 78 may be part of a different cable. In some embodiments, the memory 58 and/or storage device 60 may store configurations of the relay positions that correspond to providing AC power and providing DC power, such that the processor 56 may determine whether the relays 80 are configured to provide AC power or DC power. The power switching circuitry 70 couple the power supply 19 located at the surface 16 via the cable 14, and may supply multiple types of power (e.g., AC, DC) to other components of the toolstring 10 (e.g., the downhole tools) via the power switching circuitry 70. The power cartridge circuitry 79 may include any suitable power converter components, such as a medium voltage DC-DC converter 84, an over-voltage production/pulse harmonic modulation component 86, switches, transformers, inductors, and the like.

As illustrated, the power switching circuitry 70 includes a switch controller 82 that may control the power switching circuitry 70. The controller 82 may, for example, receive a status of a position of each relay 80 and/or change (e.g. from open to closed or vice versa) the position of each relay 80. Because the tool communication system 53 controls the downhole tools 28, 30, 32 in operation and may use both the first and second set of conductors to do so, the tool communication system 53 may not be able to effectively control the controller 82 to change the positions of the relays 80, as well as the operations of the downhole tools. Moreover, because there may be power running in the respective relays 80 corresponding to the overlapping conductors during operation of the tool communication system 53, changing the positions of the relays 80 while power is present in the relay may reduce the lifetime of the tool powered via the respective conductor or may make the system less reliable than a system that changes the relay position when power is not running in the in the respective relay.

As such, in one embodiment, the switching communication system 55 does not use the first set or the second set of conductors for communication or power may control the power switch 22 between operating DC-power devices and AC-power devices. That is, the switching communication system 55 may change the positions of the relays 80 when power is not present on the relays 80. The switching communication system 55 may be communicatively coupled to the controller 82, such that the processor 56 of the data processing system 54 may receive and/or change the position of each relay 80 via the electronics and processing system 18 and the switching communication system 55. The switching communication system 55 may avoid changing a position of a relay 80 on which power is present by communicating via a third set of conductors that does not include a conductor of the first set (e.g., used to power the AC-powered tool 28) or the second set (e.g., used to power the DC-powered tool 30). For example, Schlumberger legacy tools and Schlumberger Falcon (FLCN) tools both use the same six conductors 71-76 to receive power and communicate. As such, a suitable communication system, such as the switching communication system 55, may communicate and be powered via conductor 77. In one example, the Schlumberger LTS communicates and is powered via conductor 77 of the seven conductors in the cable 14. As such, the switching communication system 55 may coordinate with the tool communication system 53 to ensure that power is not present on the relays 80 before changing the positions of the relays 80.

Figure 3:
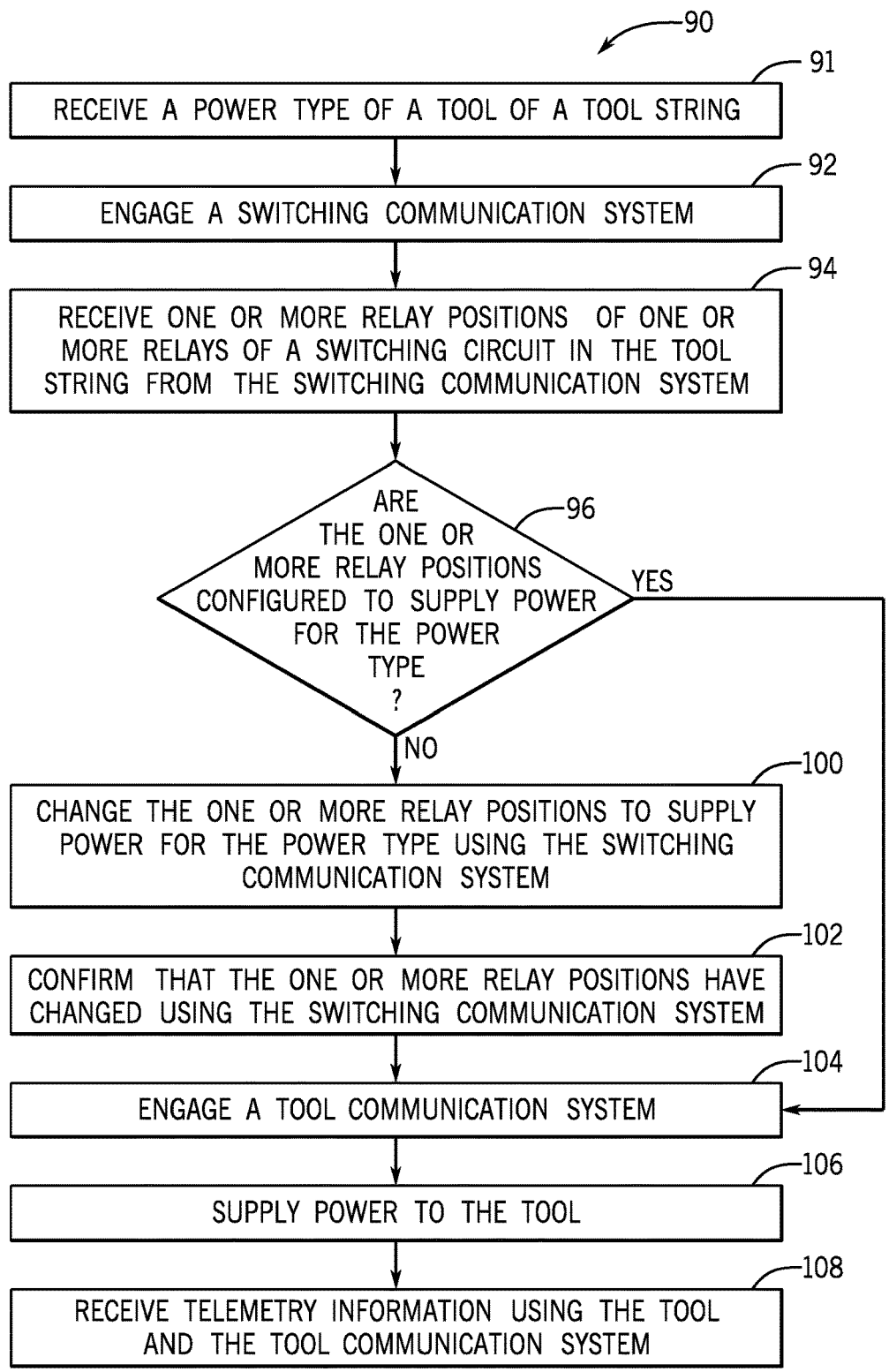
FIG. 3 is a flowchart of a method for supplying power to a downhole tool of a toolstring of FIG. 1, in accordance with an embodiment of the present disclosure.

FIG. 3 is a flowchart of a method 90 for supplying power to a downhole tool (e.g., 30) of a toolstring 10 of FIG. 1, in accordance with an embodiment of the present disclosure. The method 90 may be performed by, for example, the processor 56. Although the method 90 is described in one order, it should be noted that the method 90 may be performed in any suitable order. The processor 56 may receive (block 91) a power type of the tool 30 of the toolstring 10. For example, the power type may be AC or DC. In some embodiments, a user may enter a desired power type via, for example, an input device communicatively coupled to the data processing system 54. In some embodiments, the user may select or enter a tool type of tool 30 of the toolstring 10 via the input device. The processor 56 may receive the tool type of the tool 30 and determine (e.g., using information stored in the memory 58 or the storage device 60) the power type based on the tool type. In some embodiments, the processor 56 may receive a request to supply power of the power type.

The processor 56 may then engage (block 92), start, or otherwise activate the switching communication system 55. In some embodiments, the processor 56 may send a signal or command to the switching communication system 55 to engage the switching communication system 55. As explained above, the switching communication system 55 may then communicate and receive power via a set of conductors of the cable 14 that do not include conductors that supply power to the AC-powered tools (e.g., 28) or the DC-powered tools (e.g., 30). After engaging the switching communication system 55, the processor 56 may receive (block 94) one or more relay positions of one or more relays 80 of a switching circuit 70 in the toolstring 10 from the switching communication system 55. The processor 56 may receive the one or more relay positions via switching communication system 55, which may communicate with the power switch controller 82. As explained above, the power switch controller 82 is configured to determine the one or more relay positions. In some embodiments, the processor 56 may receive an indication of a relay configuration relating to the one or more relay positions of the switching circuit 70. The processor 56 may determine (block 96) whether the one or more relay positions are positioned to supply power for the power type of the tool 30. If so, the method 90 continues to block 104.

If the processor 56 determines (block 96) that the one or more relay positions are not positioned to supply power for the power type of the tool 30, the processor 56 may instruct the power switch controller 82, via the switching communication system 55, to change (block 100) the one or more relay positions (or the relay configuration) to supply power for the specified power type of the tool 30. In some embodiments, the processor 56 may confirm (block 102) that the one or more relay positions (or the relay configuration) have changed (to supply power for the power type of the tool 30) using the switching communication system 55 and the power switch controller 82. That is, the processor 56 may send a signal or command to the switching communication system 55 to confirm that the one or more relay positions have changed.

After the processor 56 confirms that the positions of the relays 80 are appropriately set, the processor 56 may engage (block 104), start, or otherwise send a command to the tool communication system 53 to operate the specified tool. As explained above, the tool communication system 53 may control the tool 30. As discussed above, it may be unsuitable for the tool communication system 53 to change the relay positions of the relays 80 of the power switch circuitry 70 between providing AC power and providing DC power, and vice versa, because there may be power present on the relays 80 during operation of the tool communication system 53 when changing the relay positions is desired. Since the processor 56 changed the positions of the relays 80 after power is removed from the relays 80, the processor 56 may then instruct a power supply 19 (e.g., located at the surface 16) to supply (block 106) power to the tool 30. The processor 56 may then receive (block 108) telemetry information using the tool 30 and the tool communication system 53 (via the electronics and processing system 18). The method 90 may also be used to switch to another tool (e.g., 32) of the toolstring 10 by repeating the method 90 for the other tool.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    receiving, via a processor at a surface location, a request to supply power of a first type to a toolstring disposed in a wellbore in a geological formation, wherein the toolstring comprises a first tool configured to operate using the power of the first type and a second tool configured to operate using power of a second type different from the first type;
    receiving, via the processor, an indication of a relay configuration relating to one or more relay positions of one or more relays of a switching circuit in the toolstring, wherein the relay configuration is configured to enable the switching circuit to selectively supply the power of the first type or the power of the second type to the toolstring via a switching communication system; and
    when the relay configuration does not enable the switching circuit to supply the power of the first type, sending, via the processor, a first command to the switching communication system to change the relay configuration to enable the switching circuit to supply the power of the first type; and
    operating the toolstring via a tool communication system that is different from the switching communication system.

2. The method of claim 1, comprising sending, via the processor, a second command to a power circuit of the toolstring to supply the power of the first type to the toolstring via the switching circuit.

3. The method of claim 1, comprising sending, via the processor, a second command to the switching communication system to confirm that the relay configuration is changed.

4. The method of claim 1, wherein the indication of the relay configuration is received from the switching communication system.

5. The method of claim 1, comprising receiving, via the processor, a second request to supply the power of the second type to the toolstring.

6. The method of claim 5, comprising receiving, via the processor, the indication of the relay configuration.

7. The method of claim 6, comprising sending, via the processor, a second command to the switching communication system to change the relay configuration to enable the switching circuit to supply the power of the second type, when the relay configuration does not enable the switching circuit to supply the power of the second type.

8. The method of claim 1, wherein the power of the first type comprises alternating current power.

9. The method of claim 1, wherein the power of the first type comprises direct current power.

10. One or more tangible, non-transitory, machine-readable media comprising instructions configured to cause a processor to:
    receive a power type of a tool of a toolstring;
    receive one or more relay positions of one or more relays of a switching circuit in the toolstring configured to supply power of multiple power types via a switching communication system;
    send a first command to the switching communication system to change the one or more relay positions if the switching circuit is not positioned to supply power of the power type of the tool;
    send a second command to a power circuit to supply power of the power type of the tool to the tool via the switching circuit; and
    operate the toolstring via a tool communication system that is different from the switching communication system.

11. The one or more machine-readable media of claim 10, wherein the processor is configured to receive the power type of the tool by:
    receiving a tool type of the tool; and
    determining the power type based on the tool type of the tool.

12. The one or more machine-readable media of claim 10, comprising instructions configured to cause the processor to send a third signal to the tool communication system to engage the tool communication system.

13. The one or more machine-readable media of claim 12, comprising instructions configured to cause the processor to receive telemetry information using the tool and the tool communication system.

14. The one or more machine-readable media of claim 10, comprising instructions configured to cause the processor to send a third signal to the switch communication system to engage the switch communication system.

15. A system, comprising:
    a power supply configured to supply power of a plurality of power types;
    a cable comprising a plurality of conductors, wherein the power supply is configured to couple to the cable;
    a toolstring configured to couple to the cable, wherein the toolstring comprises:
        a switching circuit configured to couple to the power supply via the cable, wherein the switching circuit comprises one or more relays;
        a switching communication system configured to couple to the switching circuit;
        a first tool configured to operate using a first power type of the plurality of power types;
        a second tool configured to operate using a second power type of the plurality of power types; and
        a tool communication system configured to couple to the first tool and the second tool, wherein the switching communication system is not the tool communication system; and
    a computing device configured to couple to the cable, wherein the computing device comprises a processor configured to:
        send a first command to the switching communication system to engage the switching communication system;
        receive one or more relay positions of the switching circuit using the switching communication system;
        send a second command to the switching communication system to change the one or more relay positions; and
        send a third command to the power supply to supply power of the first power type or the second power type based on the one or more relay positions.

16. The system of claim 15, wherein the switching communication system is configured to receive the one or more relay positions of the one or more relays of the switching circuit by receiving a signal via a first set of conductors of the plurality of conductors of the cable.

17. The system of claim 15, wherein:
the switching communication system is configured to change the one or more relay positions of the one or more relays of the switching circuit by sending a first signal via a first set of conductors of the plurality of conductors of the cable;
the one or more relay positions are configured to couple to a second set of conductors of the plurality of conductors of the cable; and
the tool communication system is configured to receive a second signal comprising telemetry information from the first tool and the second tool over the second set of conductors.

18. The system of claim 17, wherein the first set of conductors is different than the second set of conductors.

19. The system of claim 18, wherein the switching communication system and the tool communication system each comprise a telemetry system.

20. The system of claim 19, wherein the first power type is alternating current and the second power type is direct current, or the first power type is direct current and the second power type is alternating current.

* * * * *